(12) United States Patent
Nakamura

(10) Patent No.: US 6,516,936 B2
(45) Date of Patent: Feb. 11, 2003

(54) DEVICE FOR CHANGING CONVEYANCE DIRECTIONS

(75) Inventor: Tatsuhiko Nakamura, Hyogo-ken (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/884,713

(22) Filed: Jun. 19, 2001

(65) Prior Publication Data

US 2001/0052447 A1 Dec. 20, 2001

(30) Foreign Application Priority Data

Jun. 20, 2000  (JP) ........................................ 2000-184109

(51) Int. Cl.[7] .............................................. B69G 47/10
(52) U.S. Cl. ..................... 198/369.4; 198/782
(58) Field of Search ............................. 198/369.4, 782, 198/787

(56) References Cited

U.S. PATENT DOCUMENTS 3,174,613 A * 3/1965 Insolio ..................... 198/369.4
4,180,150 A * 12/1979 Moore ...................... 198/369.4
4,913,277 A * 4/1990 Zorgiebel et al. ......... 198/369.4
5,222,585 A * 6/1993 Van Der Werff ......... 198/369.4

* cited by examiner

Primary Examiner—Joseph E. Valenza
(74) Attorney, Agent, or Firm—Koda & Androlia

(57) ABSTRACT

A conveyance-direction-changing device using a mechanism in which two rotational outputs caused by forward and reverse rotations of a single motor are extracted using first and second drive gears which are rotated in the same direction regardless of the rotational direction of the motor. A work-piece-conveying roller is held by a second driven gear which is rotated in an interlocked manner with the second drive gear, and the circumferential surface of the roller is set so as to be in contact with a first driven gear which is rotated in an interlocked manner with the first drive gear.

2 Claims, 4 Drawing Sheets

DEVICE FOR CHANGING CONVEYANCE DIRECTIONS

BACKGROUND OF THE INVENTION

1. Field of the Invention

The present invention relates to a device for changing conveyance directions of a work piece and more particularly to a mechanism used for changing directions of a work piece being conveyed.

2. Prior Art

Japanese Patent Application Laid-Open (Kokai) No. 240818/1997 discloses a device for changing conveyance directions of a work piece on the same plane or on the same conveyance plane.

Such a device has unnecessarily complicated mechanisms, creating a demand for a device having a simpler mechanism. It is also desired that such a device for changing conveyance directions can be easily interconnected with other conveyance direction changing devices so as to expand the distance of conveying articles.

SUMMARY OF THE INVENTION

The present invention provides a solution to such desires by way of employing a mechanism that extracts two rotational outputs from forward and reverse rotations of a single motor.

In order to accomplish the object, in the present invention two rotational outputs that is caused by the forward and reverse rotations of a single motor, which can rotate in forward and reverse directions, are extracted separately; and one of the rotational outputs is used so as to drive a work-piece-conveying roller, which is rotatable about a horizontal axis, and the other rotational output is used to change the direction of such a work-piece-conveying roller.

In use, the work-piece-conveying roller for conveying a work piece is driven and its conveyance direction is changed by way of causing the motor to rotate in forward and reverse directions. In other words, a work piece can be conveyed in any specified direction on the same plane (or on the same conveyance plane) using a single motor.

The two rotational outputs caused by the forward and reverse rotations of the motor are extracted separately using a simple mechanism, and one of the rotational outputs is used so as to drive or rotate the work-piece-conveying roller, which is rotatable about a horizontal axis, and the other rotational output is used so as to change the direction of the work-piece-conveying roller.

The means for extracting the two rotational outputs caused by the forward and reverse rotations of the motor can be obtained by first and second drive gears, which are always rotated in the same direction regardless of whether the motor rotates in forward or reverse direction. In addition, the work-piece-conveying roller is held by a second driven gear which is rotated in an interlocked manner with the second drive gear. Furthermore, the periphery or the circumferential surface of the work-piece-conveying roller is set so as to be in contact with first driven gear which is rotated in an interlocked manner with the first drive gear.

With the above structure, the two rotational outputs caused by the forward and reverse rotations of the motor are extracted from the first and second drive gears, and the two rotational outputs that have been taken out are respectively used for driving or rotating the work-piece-conveying roller and for changing the facing direction of the work-piece-conveying roller.

Furthermore, in the present invention, a single motor that rotates in forward and reverse directions and first and second drive gears that are always rotated in the same direction regardless of the rotational direction of motor form a drive unit; a first driven gear that is rotated in an interlocked manner with the first drive gear, a second driven gear that is rotated in an interlocked manner with the second drive gear, and a work-piece-conveying roller that has a peripheral surface in contact with the first driven gear 7 form a driven unit; and a plurality of driven units are disposed in an interlocked manner with the drive unit.

In this structure, the size of a conveyance-direction-changing device unit can be changed as desired by simply increasing or decreasing the number of driven units that are arranged in an interlocked manner with the drive unit.

In addition, several conveyance-direction-changing device units each comprising the drive unit and a plurality of driven units can be disposed on the same plane (or on the same conveyance plane) in an interconnected fashion.

In this case, the size of an entire conveyance-direction-changing device can be easily and freely increased or decreased by simply increasing or decreasing the number of conveyance-direction-changing device units.

By controlling each one of the conveyance-direction-changing device units, a work-piece can be conveyed in any directions on the same plane or on the same conveyance plane.

BRIEF DESCRIPTIONS OF THE DRAWINGS

FIG. 3 is a schematic plan view showing that five driven units are arranged for a single drive unit; and.

DETAILED DESCRIPTION OF THE PREFERRED EMBODIMENTS

Preferred embodiments of the present invention will be described in detail with reference to the accompanying drawings.

Figure 1:
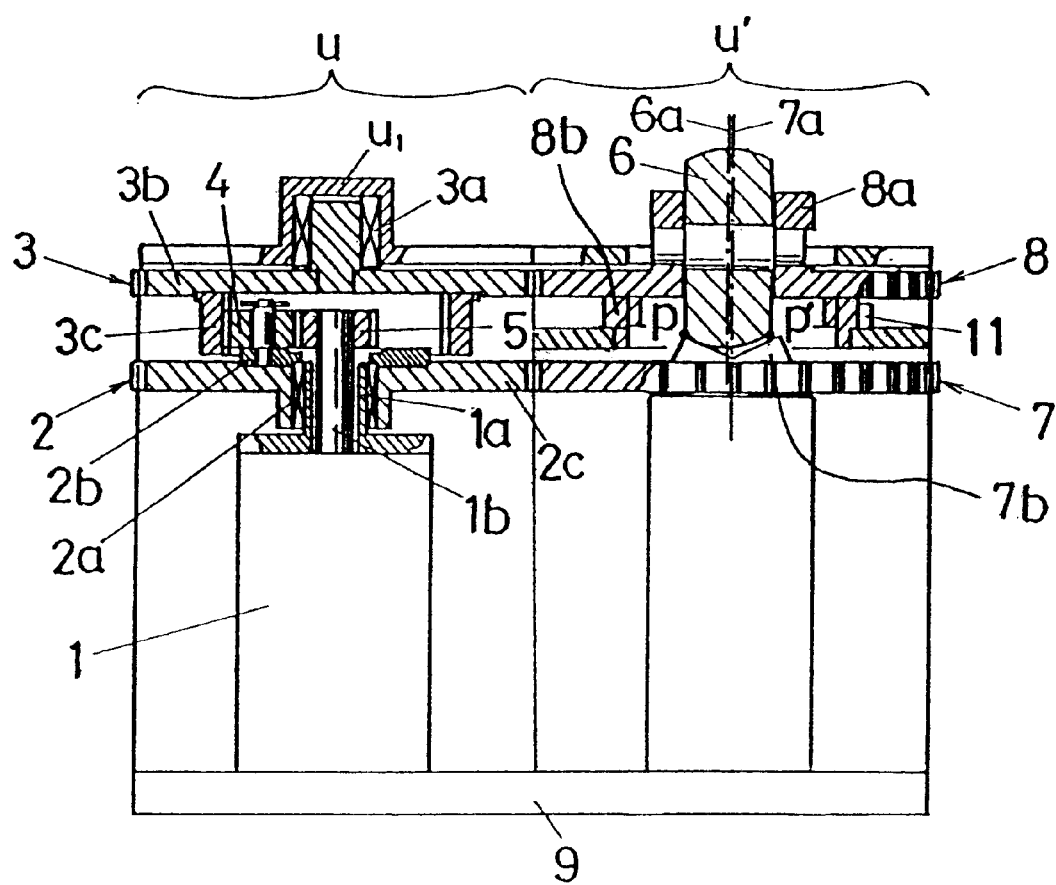
FIG. 1 is a longitudinal sectional view of one embodiment of the present invention, showing that one driven unit is disposed adjacent to one drive unit.

In FIG. 1, two rotational outputs that are caused by forward and reverse rotations of a motor 1 that is capable of rotating either direction, forward and reverse directions, are extracted separately; and one of the rotational outputs is used for driving a work-piece-conveying roller 6 that is rotatable about a horizontal axis, and the other rotational output is used for changing the direction of the roller 6.

More specifically, FIG. 1 shows that a driven unit u' is arranged adjacent to a drive unit u that is installed on a base 9. Preferably, as seen from FIG. 2, four driven units u' are arranged evenly for one drive unit u.

Figure 2:
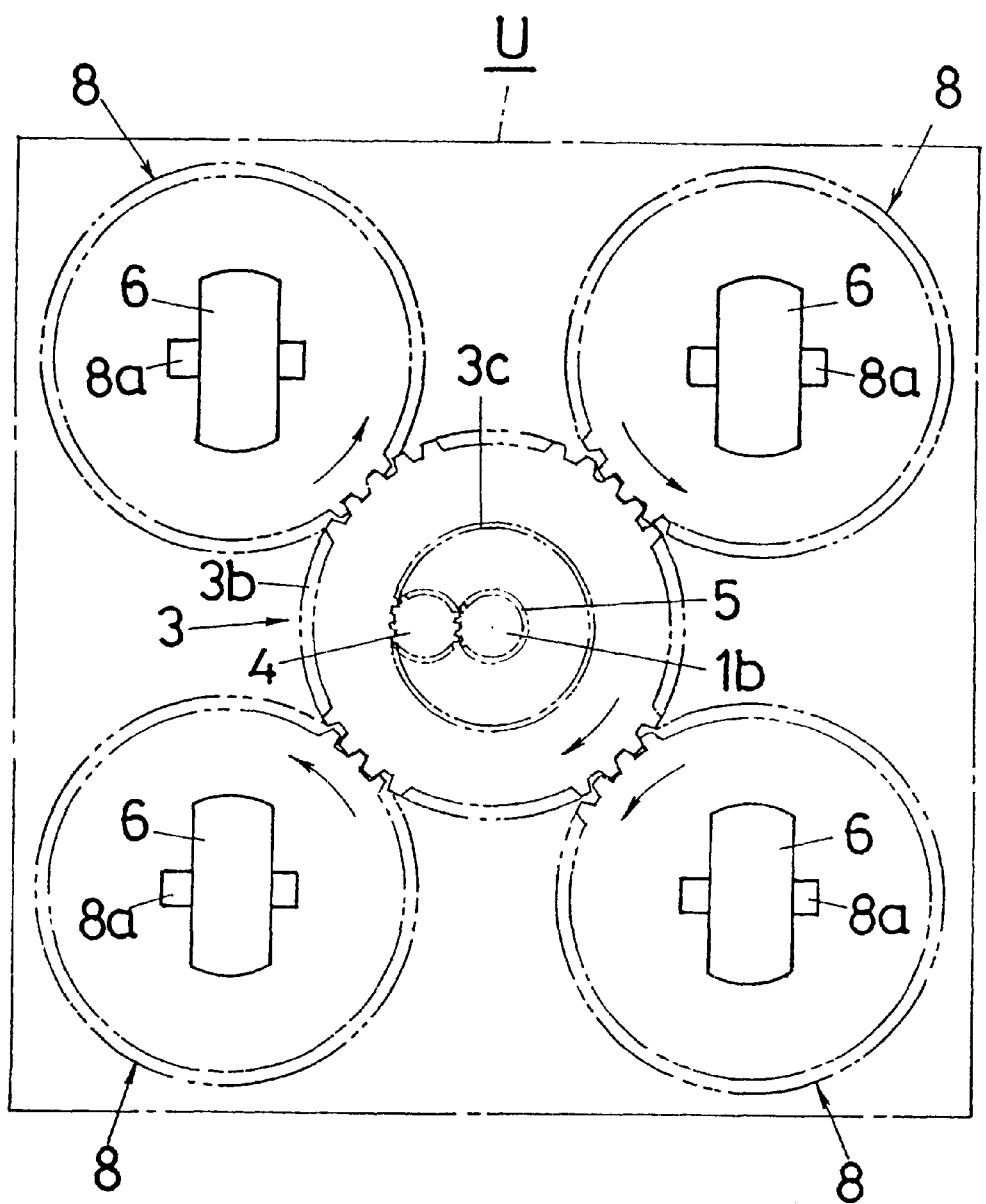
FIG. 2 is a schematic plan view showing that four driven units are arranged for a single drive unit.

For the sake of convenience, in the following description, a clockwise rotation in FIG. 2 is referred to as a forward rotation, and a counterclockwise rotation is referred to as a reverse rotation.

A rotating motor 1 that rotates in forward and reverse directions is installed on the base 9. First and second drive gears 2 and 3 that are always rotated forward regardless of whether the motor 1 rotates in forward direction or reverse direction are mounted on the shaft 1*b* of the motor 1, and these first and second drive gears 2 and 3 constitute a drive unit u together with the motor 1. On the other hand, a first driven gear 7, which is installed on the base 9 and is rotated in an interlocked manner with the first drive gear 2, a second driven gear 8, which is rotatably installed on a ring-shaped holding member 8*b* provided above the base 9 and is rotated in an interlocked manner with the second drive gear 3, and a work-piece-conveying roller 6, which is held by the second driven gear 8 and whose periphery is in contact with the first driven gear 7, constitute a driven unit u'.

In order to rotate the first and second drive gears 2 and 3 of the drive unit u forward by the motor 1 that rotates in forward and reverse directions, the drive gear 2 comprises a carrier plate 2*b*, which is mounted to a flange 1*a* of the motor 1 via a one-way clutch 2*a*, and an external gear 2*c*, which is fastened to the carrier plate 2*b* coaxially with the motor shaft 1*a*; and the second drive gear 3 comprises an external gear 3*b*, which is mounted to the external case $u_1$ of the drive unit u via a one-way clutch 3*a*, and an internal gear 3*c*, which is fastened to the external gear 3*b* coaxially with the motor shaft 1*b*.

In the outer part of the carrier plate 2*b*, an idler 4 is rotatably mounted; and the idler 4 is meshed with an external gear 5 fastened to the motor shaft 1*b* and the internal gear 3*c*.

With the above structure, when the motor 1 rotates forward, its torque is transmitted to the external gear 5 fastened to the shaft 1*b* of the motor 1 and then to the internal gear 3*c* and the external gear 3*b* via the idler 4 that meshes with the external gear 5. The torque acts on these gears 3*c* and 3*b* so as to turn them in the reverse direction, but such a rotation is restrained by the one-way clutch 3*a* that locks such gears. On the other hand, the first drive gear 2, which is connected to the carrier plate 2*b* and the external gear 2*c*, is rotated forward.

Conversely, when the motor 1 rotates reversely, its torque is transmitted to the external gear 5 fastened to the shaft 1*b* of the motor 1 and then to the carrier plate 2*b* and the external gear 2*c* via the idler 4 which meshes with the external gear 5. The torque acts on to the carrier plate 2*b* and the external gear 2*c* to turn them reversely, but the rotation is restrained by the one-way clutch 2*a*, which locks the carrier plate 2*b* and the external gear 2*c*. On the other hand, the second drive gear 3, which is connected to the internal gear 3*c* and the external gear 3*b*, is rotated forward.

The driven unit u' includes, as described above, the first and second driven gears 7 and 8. So as to rotate the driven gear 7 in an interlocked manner with the first drive gear 2, and so as to rotate the driven gear 8 in an interlocked manner with the drive gear 3, the first and second driven gears 7 and 8 shown in FIG. 1 are both external gears. These first and second driven gears 7 and 8 respectively mesh with the external gear 2*c* of the first drive gear 2 and the external gear 3*b* of the second driven gear 3.

In addition, the work-piece-conveying roller 6 is held by the second driven gear 8 which is an external gear as described above, and the periphery of the roller 6 is set so as to be in contact with the first driven gear 7 in a manner that the rotation of the first driven gear 7 is transmitted to the roller 6 and the roller 6 is rotated. In FIG. 1, the reference numeral 8*a* is a support bracket for supporting the roller 6.

With the structure above, when the first drive gear 2 is rotated forward by the motor 1 as describe above, the first driven gear 7 is rotated in an interlocked manner with the first drive gear 2, and the work-piece-conveying roller 6 whose periphery is in contact with the driven gear 7 is rotated about a horizontal axis.

When the second drive gear 3 is rotated forward (in the arrow direction of FIG. 2), the second driven gear 8 is rotated in an interlocked manner with the second drive gear 3 (in the arrow direction of FIG. 2), and the work-piece-conveying roller 6, which is held by the second driven gear 8, changes its direction or facing direction from the position shown by solid lines to another position.

As seen from the above, by way of controlling the motor 1, which rotates in forward and reverse directions, the work-piece-conveying roller 6 is rotated about a horizontal axis, and also the direction of the work-piece-conveying roller 6 can be changed automatically.

In FIG. 1, the reference numeral 11 is a sensor installed immediately below the second driven gear 8. This sensor 11 detects the amount of rotation (rotation angle) of the second driven gear 8. As a result, the directional changing angle for the roller 6 held by the second driven gear 8 can be easily known.

In the above embodiment, as seen from FIG. 1, the vertical axis 6*a* of the work-piece-conveying roller 6 can be shifted relative to the center axis 7*a* of the first driven gear 7. When the periphery of the roller 6 contacts side p of the projecting edge 7*b* of the driven gear 7, the roller 6 is rotated in one direction, whereas when the periphery of the roller 6 contacts side p' of the projecting edge of the driven gear 7, the roller 6 is rotated in the other direction.

In the above embodiment, so as to rotate the first driven gear 7 and the second driven gear 8, which are the components of the driven unit u', in an interlocked manner with the rotation of the first drive gear 2 and the rotation of the second drive gear 3 respectively, the first and second driven gears 7 and 8 are both external gears; and the first and second driven gears 7 and 8 are separately meshed with the external gear 2*c* of the first drive gear 2 and the external gear 3*b* of the second driven gear 3. It is also possible to employ another interlocking connection. For example, the first and second drive gears 2 and 3 and the first and second driven gears 7 and 8 can be all pulleys or sprockets, and the pulleys or sprockets that form a pair for rotation are connected to each other by a timing belt or a chain.

Furthermore, in the above embodiment, the first and second drive gears 2 and 3 are installed so as to be always rotated forward regardless of whether the motor 1 rotates in forward or reverse direction. It is also possible to arrange so that the drive gears 2 and 3 are rotated reversely regardless of whether the motor 1 rotates in forward or reverse direction.

Figure 3:
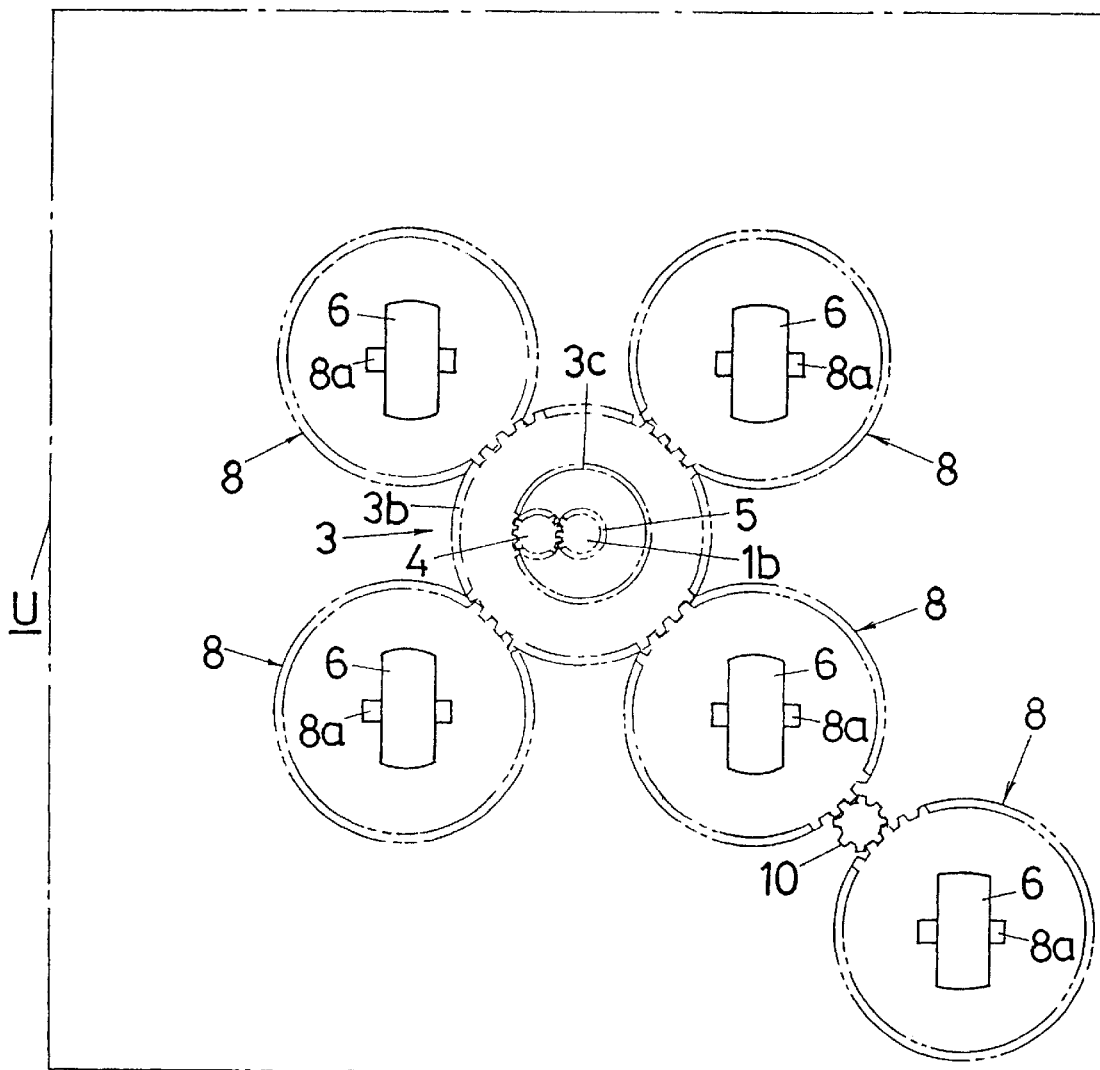

The above description details the structure that comprises the drive unit u and the driven unit u'. It is further possible to combine the same drive unit u with several driven units u'. For example, as shown in FIG. 3, one driven unit u' that is arranged so as to act in an interlocked manner with one drive unit u is further linked to another driven unit u' via an idler unit 10. With this arrangement, the size of the conveyance-direction-changing device U viewed from above can be changed by simply increasing or decreasing the number of driven units u' that are arranged in an interlocked manner with the drive unit u with a use of the idler unit 10.

Figure 4:
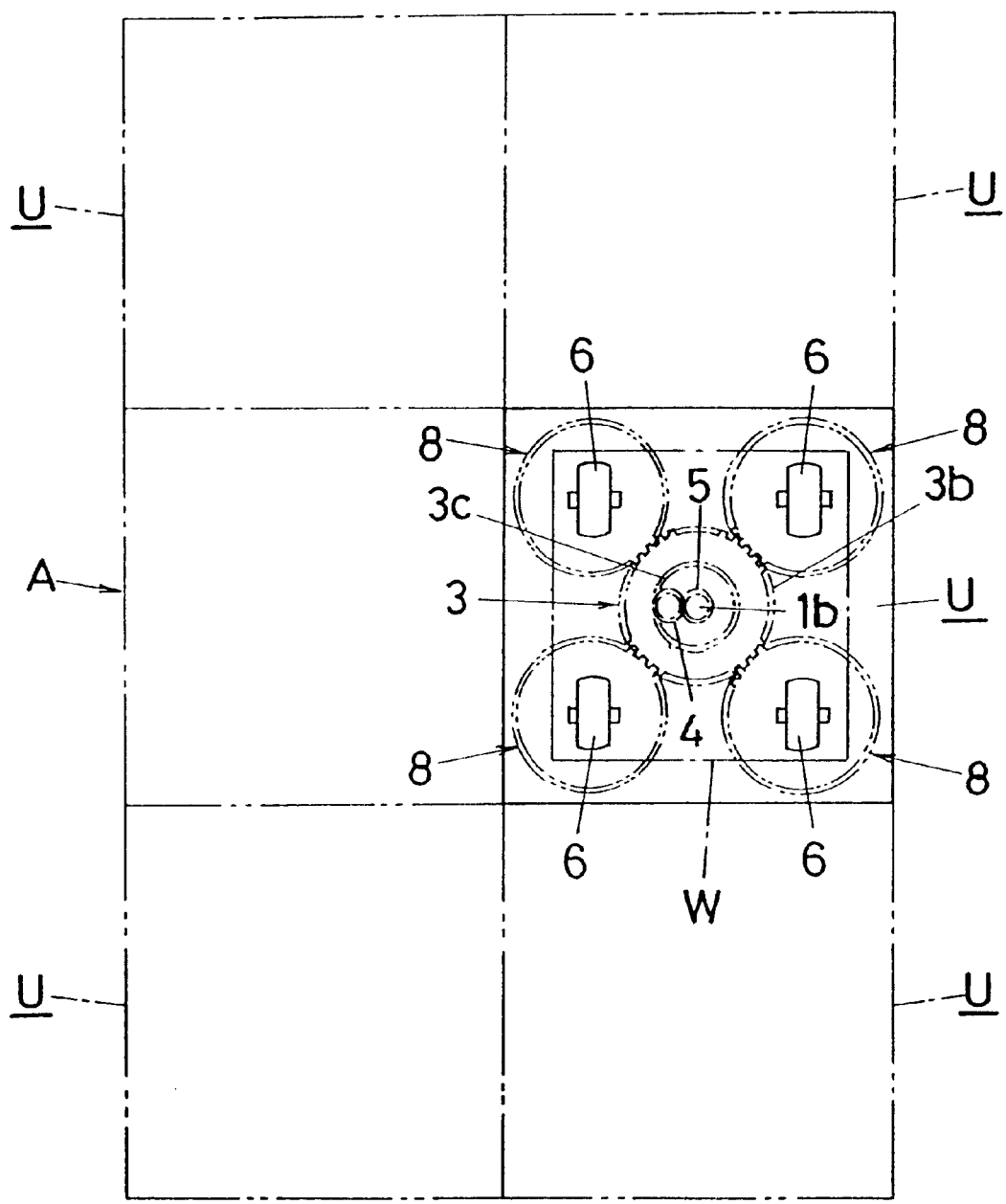
FIG. 4 is a schematic plan view showing that a plurality of (six) conveyance-direction-changing devices are arranged on the same plane.

Furthermore, several conveyance-direction-changing device units U each comprising the drive unit u and several driven units u' can be arranged on the same plane (the same conveyance plane) as shown in FIG. 4. By way of control ling each one of the conveyance-direction-changing device units individually, a work piece W can be conveyed in any direction on the same plane or on the same conveyance plane.

In this arrangement, the size of the entire conveyance-direction-changing device A, when viewed from above in FIG. 4 can be easily and freely changed by simply increasing or decreasing the number of conveyance-direction-changing device units U on the same plane (the same conveyance plane).

As seen from the above, according to the present invention, two rotational outputs brought by the forward and reverse rotations of a single motor are extracted separately by a simple mechanism; and one of the rotational outputs is used to drive the work-piece-conveying roller which is rotatable about a horizontal axis, and the other rotational output is used to change the direction of the roller.

In addition, two rotational outputs caused by the forward and reverse rotations of the motor can be extracted from the first and second drive gears that are rotated in one direction regardless of the direction of the rotation of the motor, and such two rotational outputs extracted are independently used to rotate the work-piece-conveying roller and to change its direction.

Furthermore, the size of the conveyance-direction-changing device unit can be freely changed by simply increasing or decreasing the number of driven units that are arranged in an interlinked manner with a single drive unit.

Still furthermore, the size of the entire conveyance-direction-changing device can be easily and freely changed by simply increasing or decreasing the number of the conveyance-direction-changing device units on the same plane (or on the same conveyance plane). By way of controlling each one of the conveyance-direction-changing device units individually, a work piece can be conveyed in any direction on the same plane (or on the same conveyance plane).

What is claimed is:

1. A device for driving and changing a conveyance direction of a conveyor, said device comprising:

a single motor, said motor capable of rotating in a forward and in a reverse direction and having an output shaft;

at least two rotational outputs, one of said at least two rotational outputs for driving a work-piece conveying roller and another of said two rotational output shafts for changing direction of said conveying roller;

a first external gear provided concentrically with said output shaft of said single motor;

a first one way clutch provided between a fixed support means for said motor and said first external gear;

a second external gear coupled to said one of said two rotational outputs and engaging with said first external gear;

a third external gear provided adjacent to said first external gear and concentric with said output shaft;

a second one way clutch provided between said third external gear and said fixed support means;

an internal gear provided concentrically on said third external gear;

an output gear provided on said output shaft;

an idler gear provided between said output gear and said internal gear, said idler gear being rotatably provided on said first external gear; and a fourth external gear coupled to said another of said at least two rotational outputs and engaging with said third external gear.

2. The device according to claim 1, wherein said work-piece conveying roller is coupled to said second and fourth external gears by a gear means to drive and change direction of said conveying roller.

* * * * *